(12) United States Patent
Gordon et al.

(10) Patent No.: US 9,394,915 B2
(45) Date of Patent: Jul. 19, 2016

(54) SEAL LAND FOR STATIC STRUCTURE OF A GAS TURBINE ENGINE

(75) Inventors: Amy M. Gordon, South Windsor, CT (US); Jonathan J. Jakiel, Vernon, CT (US); Jonathan P. Burt, Sturbridge, MA (US); Steven D. Porter, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 460 days.

(21) Appl. No.: 13/487,742

(22) Filed: Jun. 4, 2012

(65) Prior Publication Data

US 2013/0323046 A1    Dec. 5, 2013

(51) Int. Cl.
| F04D 29/08 | (2006.01) |
| F04D 29/54 | (2006.01) |
| F01D 11/00 | (2006.01) |
| F02C 7/28 | (2006.01) |
| F01D 25/16 | (2006.01) |

(52) U.S. Cl.
CPC ............ *F04D 29/083* (2013.01); *F01D 11/005* (2013.01); *F01D 25/162* (2013.01); *F02C 7/28* (2013.01); *F04D 29/542* (2013.01)

(58) Field of Classification Search
CPC ... F04D 29/083; F04D 29/542; F01D 11/005; F02C 7/28
USPC ............ 415/191, 209.2, 209.3; 277/606, 609, 277/616, 630, 637, 644
See application file for complete search history.

(56) References Cited

U.S. PATENT DOCUMENTS

| 3,367,628 | A | * | 2/1968 | Fitton ........................... 415/110 |
| 4,300,868 | A | * | 11/1981 | Wilkinson et al. ............ 415/137 |
| 4,384,822 | A | * | 5/1983 | Schweikl et al. ............. 415/137 |
| 4,702,670 | A | | 10/1987 | Winter |
| 4,767,260 | A | | 8/1988 | Clevenger et al. |
| 5,211,536 | A | | 5/1993 | Ackerman et al. |
| 5,218,816 | A | | 6/1993 | Plemmons et al. |
| 5,224,822 | A | * | 7/1993 | Lenahan et al. .............. 415/189 |
| 5,372,476 | A | | 12/1994 | Hemmelgarn et al. |
| 5,509,669 | A | * | 4/1996 | Wolfe ................... F01D 11/005 277/654 |
| 5,997,245 | A | | 12/1999 | Tomita et al. |
| 6,418,618 | B1 | | 7/2002 | Burdgick |
| 6,558,115 | B2 | | 5/2003 | Tiemann |
| 7,121,793 | B2 | | 10/2006 | Correia |

(Continued)

FOREIGN PATENT DOCUMENTS

| EP | 2192269 A2 | 6/2010 |
| EP | 2192271 A2 | 6/2010 |
| GB | 2280484 A | 2/1995 |

OTHER PUBLICATIONS

International Search Report and Written Opinion for International Application No. PCT/US2013/042963 dated Sep. 13, 2013.

(Continued)

*Primary Examiner* — Richard Edgar
*Assistant Examiner* — Eldon Brockman
(74) *Attorney, Agent, or Firm* — Carlson, Gaskey & Olds

(57) ABSTRACT

A seal land for a gas turbine engine can include a seal body that can extend between a leading edge portion, a trailing edge portion, a radially outer surface and a radially inner surface. A notch can extend at least partially through the seal body between the radially outer surface and the radially inner surface.

6 Claims, 6 Drawing Sheets

(56) References Cited

U.S. PATENT DOCUMENTS

| | | | |
|---|---|---|---|
| 7,862,294 B2* | 1/2011 | Tiemann et al. | 415/173.7 |
| 7,922,444 B2 | 4/2011 | Propheter-Hinckley | |
| 2004/0218014 A1* | 11/2004 | Silverbrook et al. | 347/50 |
| 2005/0135928 A1 | 6/2005 | Servadio et al. | |
| 2006/0055118 A1 | 3/2006 | Beichl | |
| 2006/0127219 A1* | 6/2006 | Zborovsky | F01D 9/023 415/229 |
| 2009/0110549 A1* | 4/2009 | Snook et al. | 415/191 |
| 2009/0322036 A1* | 12/2009 | Halling | 277/434 |
| 2010/0132369 A1 | 6/2010 | Durocher et al. | |
| 2010/0132376 A1* | 6/2010 | Durocher et al. | 60/797 |
| 2011/0023496 A1* | 2/2011 | Bastnagel et al. | 60/752 |
| 2011/0079019 A1 | 4/2011 | Durocher et al. | |
| 2011/0214433 A1 | 9/2011 | Feindel et al. | |
| 2012/0195745 A1* | 8/2012 | Kapala | 415/200 |
| 2012/0292860 A1* | 11/2012 | Moehrle | F01D 9/023 277/640 |

OTHER PUBLICATIONS

International Preliminary Report on Patentability for International Application No. PCT/US2013/042963 dated Dec. 18, 2014.
Extended European Search Report for Application No. EP 13 80 1167 dated Dec. 10, 2015.

* cited by examiner

SEAL LAND FOR STATIC STRUCTURE OF A GAS TURBINE ENGINE

BACKGROUND

This disclosure relates to a gas turbine engine, and more particularly to a static structure that can be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Gas turbine engines may be assembled from numerous coaxial housings and components that must be sealed relative to one another to address pressure differentials and thermal loading that can exist between these components during gas turbine engine operation. For example, static structures, such as mid-turbine frames, ducts, vane assemblies, nozzle assemblies and the like, may need to be sealed relative to cavities that extend between the static structures and inner and outer casings of an engine static structure.

SUMMARY

A seal land for a gas turbine engine according to an exemplary embodiment of the present disclosure can include a seal body that can extend between a leading edge portion, a trailing edge portion, a radially outer surface and a radially inner surface. A notch can extend at least partially through the seal body between the radially outer surface and the radially inner surface.

In a further embodiment of the foregoing seal land embodiment, one of the radially outer surface and the radially inner surface can include a conical surface and the other of the radially outer surface and the radially inner surface includes a cylindrical surface.

In a further embodiment of either of the foregoing seal land embodiments, the notch can be V-shaped.

In a further embodiment of any of the foregoing seal land embodiments, the notch can be formed at the trailing edge portion of the seal body.

A static structure for a gas turbine engine according to another exemplary embodiment of the present disclosure can include at least one airfoil that extends between an inner platform and an outer platform. At least one seal land can extend from one of the inner platform and the outer platform, and the at least one seal land can include a radially outer surface, a radially inner surface and a notch circumferentially disposed between the radially outer surface and the radially inner surface.

In a further embodiment of the foregoing static structure embodiment, the static structure can include a mid-turbine frame.

In a further embodiment of either of the foregoing static structure embodiments, the at least one seal land can include at least one relief slot.

In a further embodiment of any of the foregoing static structure embodiments, a seal ring can be positioned between the at least one seal land and a casing of an engine static structure.

In a further embodiment of any of the foregoing static structure embodiments, one of the radially outer surface and the radially inner surface can include a conical surface.

In a further embodiment of any of the foregoing static structure embodiments, one of the radially inner surface and the radially outer surface can include a cylindrical surface.

In a further embodiment of any of the foregoing static structure embodiments, the notch can extend aft of a trailing edge of said at least one airfoil.

In a further embodiment of any of the foregoing static structure embodiments, the notch can be V-shaped.

In a further embodiment of any of the foregoing static structure embodiments, the at least one seal land can be positioned at an aft, inner diameter portion of the static structure.

In a further embodiment of any of the foregoing static structure embodiments, the notch can circumferentially extend about a trailing edge portion of the at least one seal land.

A gas turbine engine according to yet another exemplary embodiment of the present disclosure can include a compressor section, a combustor section in fluid communication with the compressor section, a turbine section in fluid communication with the combustor section, and a static structure positioned relative to at least one of the compressor section, the combustor section and the turbine section. The static structure can include a multitude of airfoils and at least one seal land that extends from a portion of each of the multitude of airfoils. The at least one seal land can include a notch circumferentially disposed aft of a trailing edge of each of the multitude of airfoils.

In a further embodiment of the foregoing gas turbine engine embodiment, each of the multitude of airfoils can extend between an inner platform and an outer platform, and the at least one seal land can extend from at least one of the inner platform and the outer platform.

In a further embodiment of either of the foregoing gas turbine engine embodiments, the at least one seal land can include a radially outer surface and a radially inner surface. One of the radially outer surface and the radially inner surface can be mounted to one of the inner platform and the outer platform.

In a further embodiment of any of the foregoing gas turbine engine embodiments, the radially outer surface of the at least one seal land can include a conical surface.

In a further embodiment of any of the foregoing gas turbine engine embodiments, the radially inner surface of the at least one seal land can include a cylindrical surface.

In a further embodiment of any of the foregoing gas turbine engine embodiments, the notch can be V-shaped.

The various features and advantages of this disclosure will become apparent to those skilled in the art from the following detailed description. The drawings that accompany the detailed description can be briefly described as follows.

DETAILED DESCRIPTION

Figure 1:
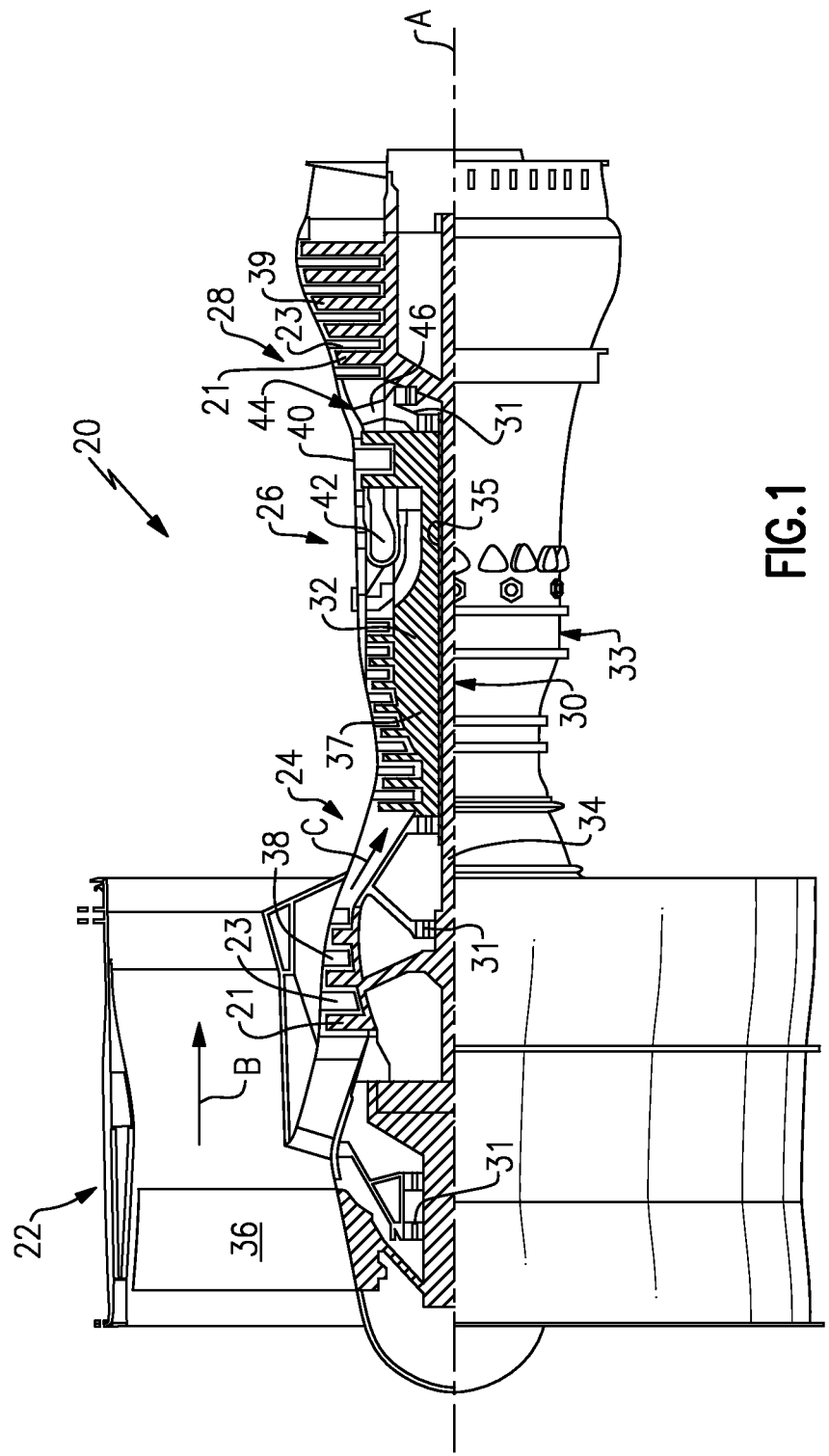
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 24 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A relative to an engine static structure 33 via several bearing systems 31. It should be understood that various bearing systems 31 at various locations may alternatively or additionally be provided.

The low speed spool 30 generally includes an inner shaft 34 that interconnects a fan 36, a low pressure compressor 38 and a low pressure turbine 39. The high speed spool 32 includes an outer shaft 35 that interconnects a high pressure compressor 37 and a high pressure turbine 40. In this example, the inner shaft 34 and the outer shaft 35 are supported at various axial locations by bearing systems 31 positioned within the engine static structure 33.

A combustor 42 is arranged between the high pressure compressor 37 and the high pressure turbine 40. A static structure 44 of the engine static structure 33, also referred to as a mid-turbine frame, can be arranged generally between the high pressure turbine 40 and the low pressure turbine 39. The static structure 44 can support one or more bearing systems 31 of the turbine section 28. The static structure 44 can include one or more airfoils 46 that can be positioned within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective low speed spool 30 and the high speed spool 32 in response to the expansion. The compressor section 24 and the turbine section 28 can each include alternating, rows of rotor assemblies and vane assemblies. The rotor assemblies carry a plurality of rotating blades 21, while each vane assembly includes a plurality of vanes 23.

Figure 2:
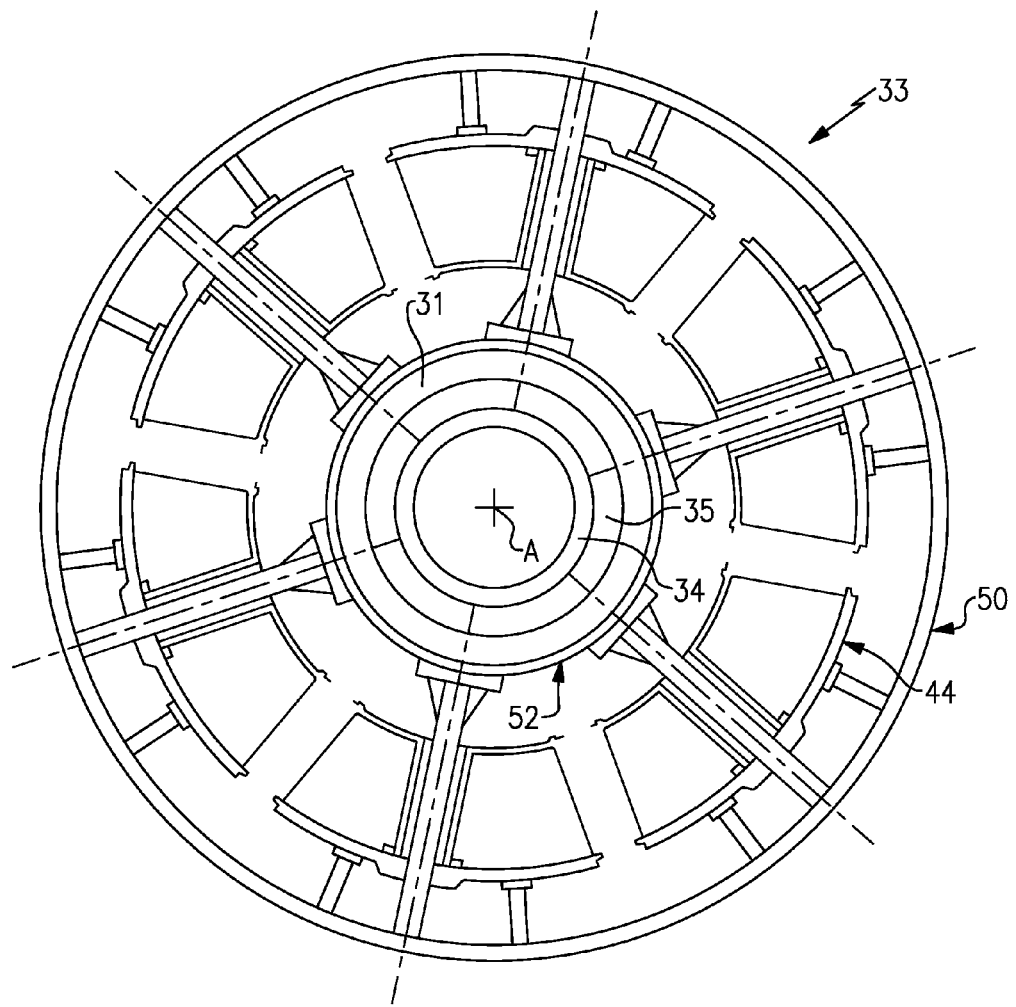
FIG. 2 illustrates a cross-section of a static structure that can be incorporated into a gas turbine engine.

FIG. 2 illustrates a static structure 44 that can be incorporated into a gas turbine engine, such as the gas turbine engine 20. In this example, the static structure 44 is a mid-turbine frame that can be positioned between the high pressure turbine 40 and the low pressure turbine 39 (See FIG. 1). However, the teachings of this disclosure are not limited to the mid-turbine frame and could extend to other static structures, including but not limited to, ducts, vane assemblies, nozzle assemblies and any other full hoop ring assemblies.

The static structure 44 can be mounted to extend between an outer casing 50 and an inner casing 52 of the engine static structure 33. For example, the outer casing 50 and the inner casing 52 can be part of a turbine exhaust case of the engine static structure 33. The inner casing 52 can support a bearing system 31 as well as other components within which the inner and outer shafts 34, 35 rotate.

The static structure 44 can be mechanically attached relative to the outer casing 50 and inner casing 52 or can be thermally free relative to these structures. It should be understood that various attachment arrangements may alternatively or additionally be utilized.

Figure 3:
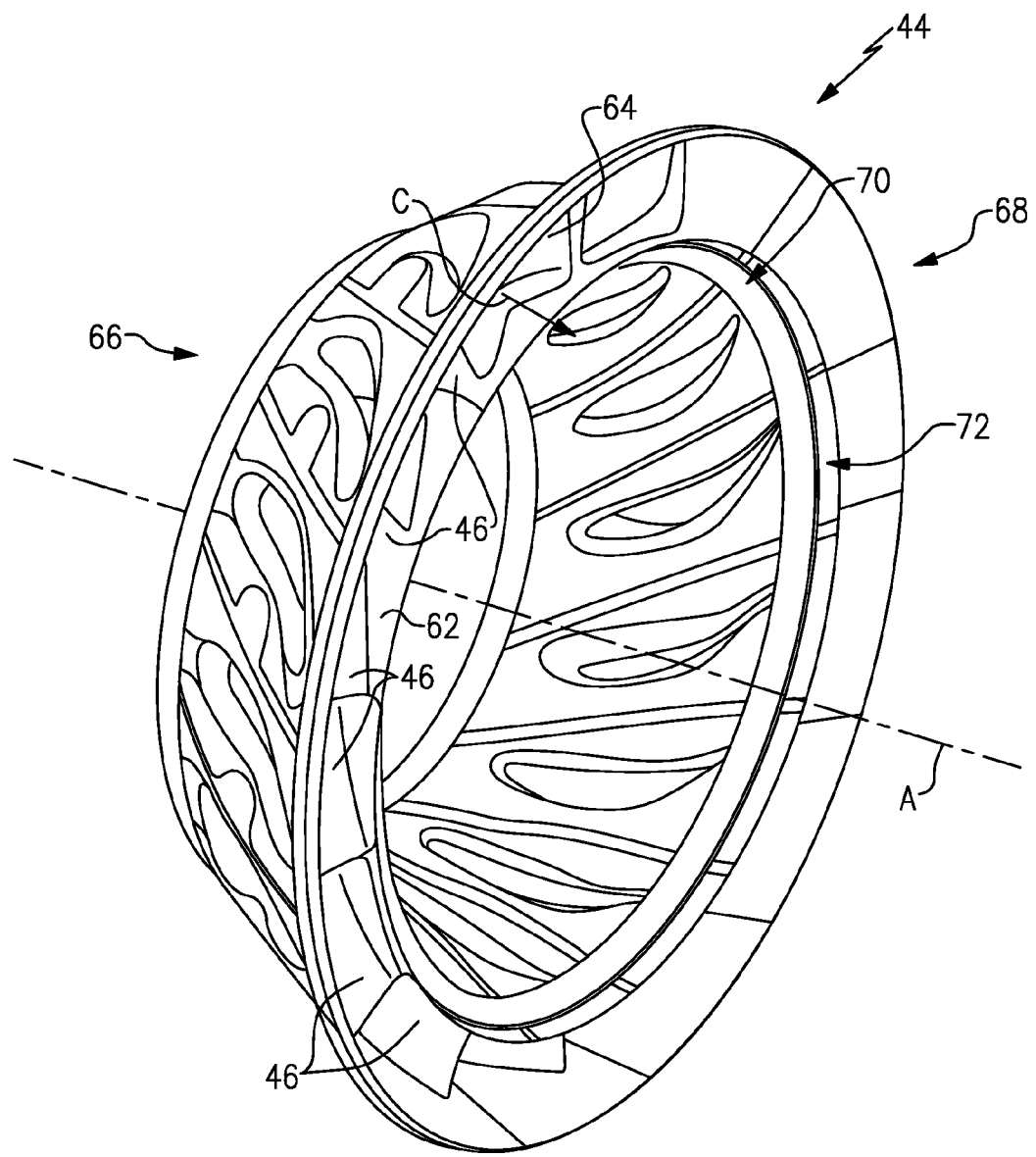
FIG. 3 illustrates a perspective view of a static structure.

Referring to FIG. 3, the exemplary static structure 44 can include a multitude of airfoils 46 that radially extend between an inner platform 62 and an outer platform 64 of the static structure 44. The multitude of airfoils 46 are axially disposed between a leading edge 66 and a trailing edge 68 of the static structure 44.

The multitude of airfoils 46 can be assembled to form an annular ring assembly that circumferentially extends about the engine centerline longitudinal axis A to define a portion of the annular core flow path C radially between the inner platform 62 and the outer platform 64 and across the multitude of airfoils 46. In other words, the inner platform 62 and the outer platform 64 establish the inner and outer boundaries of the core flow path C within the static structure 44.

The static structure 44 can include one or more sealing mechanisms, such as a seal land, that can be incorporated onto the static structure 44 to seal the static structure 44 relative to the inner casing 52 and the outer casing 50 (See FIG. 2), or other surrounding structures. In one non-limiting embodiment, the static structure 44 includes a seal land 70 that can be mounted to, integrally cast, integrally machined or integrally forged with the static structure 44 to enable sealing at one or more portions of the static structure 44, as is further discussed below.

Figure 4:
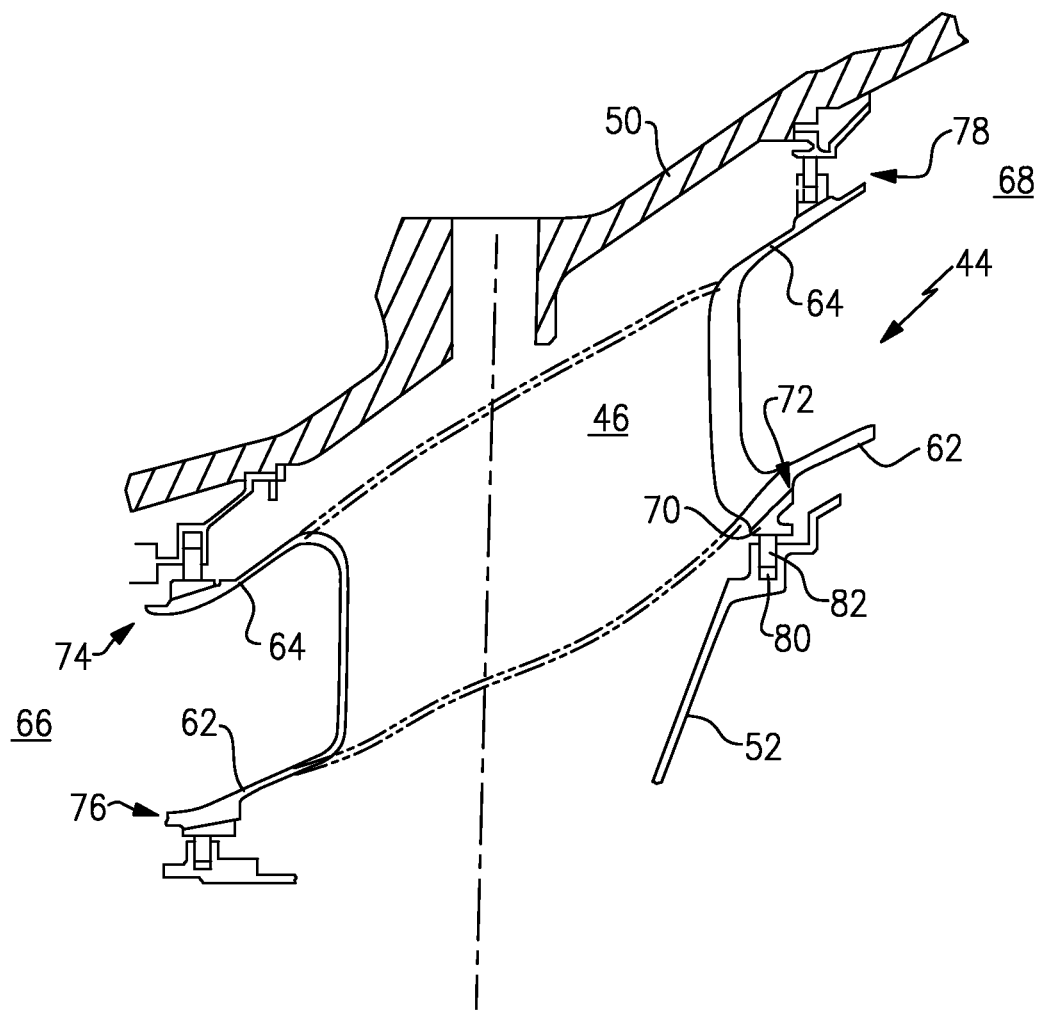
FIG. 4 illustrates a cross-sectional view of a portion of a static structure.

FIG. 4 illustrates a cross-sectional view of a portion of the static structure 44. In this exemplary embodiment, the static structure 44 may require sealing at an upstream, outer diameter portion 74, an upstream, inner diameter portion 76, an aft, outer diameter portion 78 and/or an aft, inner diameter portion 72. Although the various features of the seal land 70 are described herein with respect to the aft, inner diameter portion 72 of the static structure 44, it should be understood that seal lands 70 could be arranged to seal one or more portions of the static structure 44, including but not limited to, the upstream, outer diameter portion 74, the upstream, inner diameter portion 76, and/or the aft, outer diameter portion 78. The seal land 70 can be circumferentially disposed about the engine centerline axis A adjacent the trailing edge 68 of the static structure 44 and at the inner platform 62 of the multitude of airfoils 46 (only one shown in FIG. 4). In other words, in this example, the seal land 70 extends from the static structure 44 at its aft, inner diameter portion 72.

In one exemplary embodiment, the static structure 44, including the seal land 70, may be manufactured of a cast nickel alloy. However, it should be understood that various other materials may be utilized and may be specifically selected to match a coefficient of thermal expansion between the different parts of the static structure 44.

The seal land 70 can radially extend between the inner platform 62 and the inner casing 52 of the engine static structure 33. For example, the inner casing 52 may include a portion of a turbine exhaust case where the static structure 44 is a mid-turbine frame. However, other sections of the gas turbine engine 20 could also benefit from this disclosure.

The inner casing 52 can include a recess 80 that can receive a seal ring 82 that extends radially between the seal land 70 and the inner casing 52 to seal the aft, inner diameter portion 72 of the static structure 44. The seal ring 82 could include a piston seal or any other suitable seal.

Figure 5:
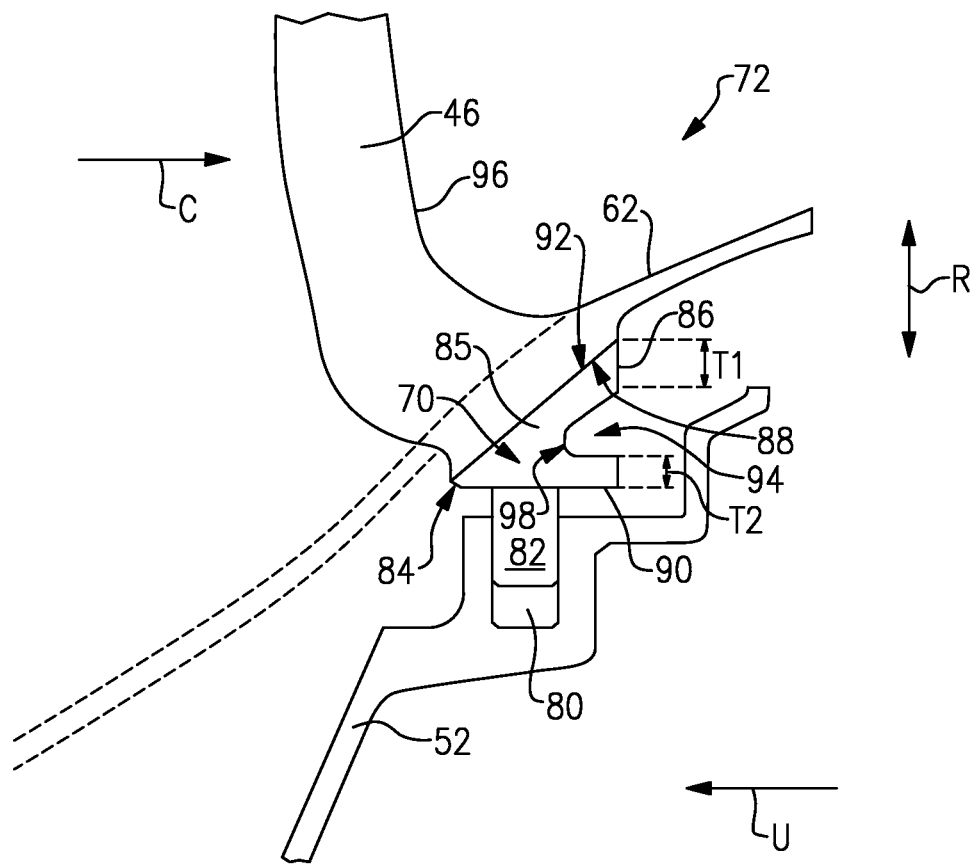
FIG. 5 illustrates an enlarged, cross-sectional view of a portion of a static structure.

FIG. 5 illustrates an enlarged view of the aft, inner diameter portion 72 of the static structure 44. As stated above, the seal land 70 can extend in a radial direction R between the inner platform 62 and the inner casing 52. The exemplary seal land 70 includes a seal body 85 having a leading edge portion 84, a trailing edge portion 86, a radially outer surface 88 and a radially inner surface 90. In one exemplary embodiment, the radially outer surface 88 includes a conical surface that axially extends transversely relative to the engine centerline longitudinal axis A. The radially outer surface 88 can provide a braze surface for mounting the seal land 70 to an inner surface 92 of the inner platform 62. However, it should be understood that other attachment arrangements may alternatively or additionally be utilized, and the seal land 70 could also be cast integrally with the inner platform 62.

The radially inner surface 90 can include a cylindrical surface. The radially inner surface 90 provides a cylindrical sealing surface for sealing relative to the seal ring 82. It should be understood that the cylindrical sealing surface could alternatively be the radially outer surface of the seal land 70 where the seal land 70 is positioned relative to either the upstream, outer diameter portion 74 or the aft, outer diameter portion 78 of the static structure.

The seal body 85 can also include at least one notch 94 that is circumferentially disposed between the radially outer surface 88 and the radially inner surface 90 of the seal land 70. In this exemplary embodiment, the notch 94 extends from the trailing edge portion 86 in a direction toward the leading edge portion 84. In other words, the notch 94 can extend through a portion of the seal body 85 in an upstream direction U relative to the static structure 44.

The notch 94 can be V-shaped. However, other shapes and configurations are contemplated as within the scope of this disclosure. In this exemplary embodiment, the notch 94 is positioned such that it extends aft from a trailing edge 96 of the airfoil 46. In addition, a point 98 of the notch 94 can be positioned aft of the seal ring 82. The actual position, depth and dimensions of the notch 94 may vary and are dependent on design and environmental specific parameters.

In one exemplary embodiment, the notch 94 is formed at the trailing edge 86 of the seal body 85 such that a first thickness T1 extends radially outward of the notch 94 and a second thickness T2 extends radially inwardly from the notch 94. The first thickness T1 can be different from the second thickness T2. The notch 94 removes weight from the seal land 70 and can alleviate thermal mismatch that may occur between the seal land 70 and the hot combustion gases that are communicated along the core flow path C through the static structure 44.

Figure 6A:
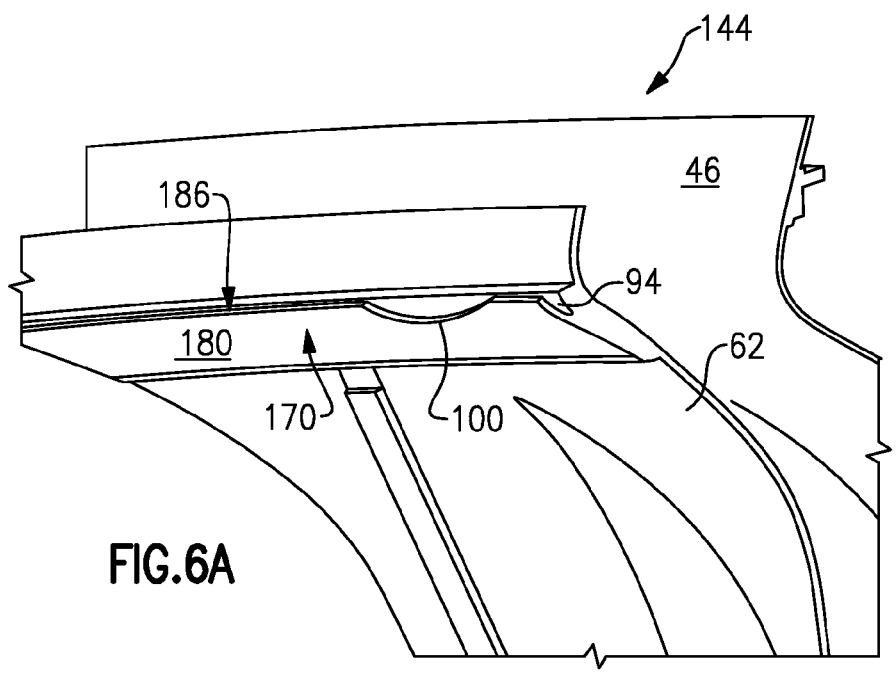
FIGS. 6A and 6B illustrate portions of additional static structures.
Figure 6B:
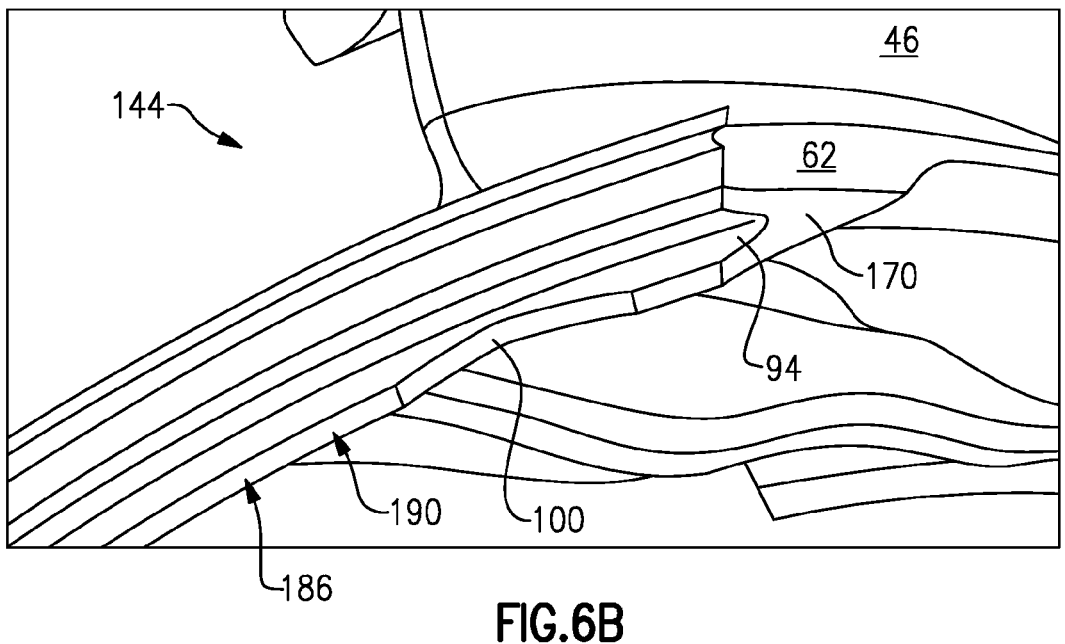

FIGS. 6A and 6B illustrate portions of another example static structure 144. The static structure 144 can include a seal land 170 that is similar to the seal land 70 detailed above. However, the seal land 170 can include additional features. For example, the seal land 170 can include one or more relief slots 100 (i.e., cut-out portions of the seal land 170). Although only a single relief slot 100 is illustrated in FIGS. 6A and 6B, it should be understood that the seal land 170 of the static structure 144 could include a multitude of relief slots 100 circumferentially disposed in a spaced relationship about the seal land 170.

In one exemplary embodiment, the relief slots 100 extend from a trailing edge 186 of the seal land 170 in the same direction as the notch 94. The relief slots 100 can be generally crescent shaped. The relief slots 100 can also extend to the same depth as the notch 94. In this exemplary embodiment, the relief slots 100 are formed on a radially inner surface 190 of the seal land 170.

In one example, at least one relief slot 100 is associated with each of the airfoils 46 of the static structure 144. In other words, if the static structure 144 were to include (14) airfoils 46, then the seal land 170 could include (14) relief slots 100. The relief slots 100 may reduce the strain experienced at portions of the airfoils 46, such as the leading or trailing edge portions.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would recognize that various modifications could come within the scope of this disclosure. For these reasons, the following claims should be studied to determine the true scope and content of this disclosure.

What is claimed is:

1. A seal land for a gas turbine engine, comprising:
a seal body mounted to a platform of a gas turbine engine component, said seal body extending between a leading edge portion, a trailing edge portion, a radially outer surface and a radially inner surface, and said seal body is tapered from said trailing edge portion to said leading edge portion; and
a notch that extends at least partially through said seal body between said radially outer surface and said radially inner surface and extending from one of said leading edge portion and said trailing edge portion toward the other of said leading edge portion and said trailing edge portion, and a first thickness of said seal body extends radially outward of said notch and a second, different thickness of said seal body extends radially inward of said notch.

2. The seal land as recited in claim 1, wherein one of said radially outer surface and said radially inner surface includes a conical surface and the other of said radially outer surface and said radially inner surface includes a cylindrical surface.

3. The seal land as recited in claim 1, wherein said notch is V-shaped.

4. The seal land as recited in claim 1, wherein said notch is formed at said trailing edge portion of said seal body.

5. The seal land as recited in claim 1, wherein said notch extends from said trailing edge portion toward said leading edge portion.

6. The seal land as recited in claim 1, wherein said seal body is brazed onto said platform or integrally molded with said platform.

* * * * *